US011359538B2

(12) United States Patent
Sharp et al.

(10) Patent No.: US 11,359,538 B2
(45) Date of Patent: Jun. 14, 2022

(54) VALVE

(71) Applicant: Cummins Ltd, London (GB)

(72) Inventors: Nicholas Kenneth Sharp, Huddersfield (GB); Nicholas Browning, Huddersfield (GB)

(73) Assignee: CUMMINS LTD, London (GB)

( * ) Notice: Subject to any disclaimer, the term of this patent is extended or adjusted under 35 U.S.C. 154(b) by 178 days.

(21) Appl. No.: 16/640,162

(22) PCT Filed: Aug. 22, 2018

(86) PCT No.: PCT/GB2018/052381
§ 371 (c)(1),
(2) Date: Feb. 19, 2020

(87) PCT Pub. No.: WO2019/038539
PCT Pub. Date: Feb. 28, 2019

(65) Prior Publication Data
US 2020/0173348 A1  Jun. 4, 2020

(30) Foreign Application Priority Data

Aug. 22, 2017 (GB) ..................... 1713453

(51) Int. Cl.
*F02B 37/18* (2006.01)
*F01N 13/10* (2010.01)
(Continued)

(52) U.S. Cl.
CPC ............ *F02B 37/183* (2013.01); *F01N 13/10* (2013.01); *F16K 11/0853* (2013.01); *F02M 26/13* (2016.02)

(58) Field of Classification Search
CPC ........ F01N 13/10; F02B 37/025; F02B 37/18; F02B 37/183; F02M 26/13; F02M 26/43;
(Continued)

(56) References Cited

U.S. PATENT DOCUMENTS 3,484,078 A   12/1969   Haenky
4,138,849 A   2/1979   Wilber
(Continued)

FOREIGN PATENT DOCUMENTS

CN   101849089 A   9/2010
CN   102072011 A   5/2011
(Continued)

OTHER PUBLICATIONS

DE102011107413 Translation; Bey; Jan. 17, 2013.*
(Continued)

*Primary Examiner* — Jesse S Bogue
(74) *Attorney, Agent, or Firm* — Faegre, Drinker, Biddle & Reath LLP

(57) ABSTRACT

A turbine bypass valve comprising: a casing defining first and second casing ports; and a valve cartridge mounted to the casing; wherein the valve cartridge comprises: first and second valve ports; and a valve member, the valve member being movable between a first position in which there is a flow path between the first and second valve ports, and a second position in which the valve member substantially blocks said flow path between the first and second valve ports; and wherein the valve cartridge is mounted to the casing such that the first valve port is aligned with the first casing port, and the second valve port is aligned with the second casing port.

33 Claims, 3 Drawing Sheets

(51) Int. Cl.
*F16K 11/085* (2006.01)
*F02M 26/13* (2016.01)

(58) Field of Classification Search
CPC .. F16K 11/085; F16K 11/0853; F16K 5/0492; F16K 5/18; Y02T 10/12
See application file for complete search history.

(56) References Cited

U.S. PATENT DOCUMENTS

| | | | |
|---|---|---|---|
| 4,177,006 A * | 12/1979 | Nancarrow | F02B 37/025 415/151 |
| 4,245,953 A * | 1/1981 | Milton | F02B 37/183 415/144 |
| 5,046,317 A | 9/1991 | Satokawa | |
| 5,943,864 A * | 8/1999 | Sumser | F02B 37/025 60/602 |
| 9,523,434 B2 | 12/2016 | Magahama | |
| 9,995,207 B2 * | 6/2018 | Robinson | F02B 37/013 |
| 10,590,838 B2 * | 3/2020 | Rankenberg | F02B 37/025 |
| 10,890,107 B2 * | 1/2021 | Lindner | F01D 17/105 |
| 2009/0151352 A1 | 6/2009 | McEwan et al. | |
| 2015/0337717 A1 | 11/2015 | Robinson et al. | |
| 2017/0082016 A1 | 3/2017 | Nowak et al. | |

FOREIGN PATENT DOCUMENTS

| | | |
|---|---|---|
| CN | 102400818 A | 4/2012 |
| CN | 104136734 A | 11/2014 |
| CN | 104854386 A | 8/2015 |
| CN | 106523137 A | 3/2017 |
| CN | 106640348 A | 5/2017 |
| CN | 107002554 A | 8/2017 |
| DE | 102011014120 A1 | 9/2012 |
| DE | 102011107413 A1 | 1/2013 |
| DE | 202014009873 U1 | 3/2016 |
| EP | 1063423 A2 | 12/2000 |
| EP | 2143905 A1 | 1/2010 |
| GB | 1596670 A | 8/1981 |
| JP | 2009-539018 A | 11/2009 |
| WO | 2004053310 A1 | 6/2004 |
| WO | 2016094265 A1 | 6/2016 |

OTHER PUBLICATIONS

Search Report issued by the United Kingdom Intellectual Property Office dated Jan. 25, 2018 for Application No. GB1713453.7; 6 pages.

International Search Report and Written Opinion issued by the European Patent Office, dated Nov. 6, 2018, for International Application No. PCT/GB2018/052381; 10 pages.

* cited by examiner

VALVE

CROSS-REFERENCE TO RELATED APPLICATIONS

The present application is a National State Application under 35 U.S.C. § 371 of PCT Application No. PCT/GB2018/052381, filed Aug. 22, 2018, which claims priority to U.K. Application No. 1713453.7, filed Aug. 22, 2017, the entire disclosures of which being hereby expressly incorporated herein by reference.

FIELD OF THE DISCLOSURE

The present disclosure relates to a valve. In particular, the valve may be a turbine bypass valve suitable for bypassing the inlet to a turbine. The disclosure also relates to a valve cartridge, which may form part of a valve such as a turbine bypass valve; and a method for assembling a valve, such as a turbine bypass valve.

BACKGROUND

Turbines are well known devices for converting the kinetic energy within a flowing gas into useful work. In particular, known turbines convert the kinetic energy of flowing gas into rotation of a rotor (or turbine wheel) of the turbine. The rotation of the rotor may be transmitted by a suitable linkage to any device suitable for doing useful work. Examples of such device include a power generator (such that the turbine forms part of a power turbine) and a compressor (such that the turbine forms part of a turbocharger).

As is well known in the art, turbochargers function by their turbine receiving exhaust gas from an internal combustion engine and consequently rotating a turbine wheel of the turbocharger so as to drive a compressor wheel for rotation. The compressor wheel draws in gas and pressurises it so that the gas output by the compressor is at an elevated pressure (or boost pressure) as compared to that at the inlet of the compressor. The output of the compressor of the turbocharger (i.e. the gas at boost pressure) can be fed to an inlet of the internal combustion engine of which the turbocharger forms part.

In some applications of turbine, a turbine bypass valve may be required to enable exhaust gas produced by the engine to which the turbine is attached to bypass the turbine so it flows to an exhaust after treatment system of the engine without passing through the turbine.

Known turbine bypass valves can be difficult to manufacture to the required tolerances and therefore expensive. What is more, it can be complicated to integrate a turbine bypass valve into the portion of the engine concerned.

There exists a need to provide an alternative turbine bypass valve which overcomes one or more of the disadvantages of known bypass valves whether set out above or otherwise. Additionally, there is a need for an alternative turbine bypass valve.

SUMMARY

According to a first aspect of the present disclosure, there is provided a turbine bypass valve comprising a casing defining first and second casing ports; and a valve cartridge mounted to the casing; wherein the valve cartridge comprises first and second valve ports; and a valve member, the valve member being movable between a first position in which there is a flow path between the first and second valve ports, and a second position in which the valve member substantially blocks said flow path between the first and second valve ports; and wherein the valve cartridge is mounted to the casing such that the first valve port is aligned with the first casing port, and the second valve port is aligned with the second casing port.

The casing may further define a third casing port. The valve cartridge may further comprise a third valve port. In the second position there may be a flow path between the first and third valve ports. The valve cartridge may be mounted to the casing such that the third valve port is aligned with the third casing port.

The casing may define a valve cavity which receives the valve cartridge.

The casing ports may adjoin the valve cavity.

The valve member may be located in a valve chamber.

In the first position, said flow path between the first and second valve ports may be via the valve chamber. In the second position, the valve member may substantially block said flow path between the first and second valve ports via the valve chamber.

The valve may be a rotary valve, whereby said movement of the valve member between the first and second positions is a rotation.

Said casing may form part of a turbine housing or exhaust manifold of an engine of which the turbine bypass valve forms part.

The valve cartridge may comprise an anti-rotation feature configured to prevent relative rotation between the casing and the valve cartridge when the valve cartridge is mounted to the casing.

The casing may comprise a second anti-rotation feature configured to engage the anti-rotation feature when the valve cartridge is mounted to the casing.

The anti-rotation feature may comprise a protrusion which projects outwardly from the valve cartridge and the second anti-rotation feature may comprise a recess configured to receive said protrusion.

The valve cartridge may comprise a main body which supports the valve member. The main body may have an outer surface which contacts the casing when the valve cartridge is mounted to the casing. The outer surface may be formed of a deformable and/or abradable material which conforms to a shape of the casing when the valve cartridge is mounted to the casing.

Each of the first and second casing ports and the corresponding first and second valve ports may be configured such that when the valve cartridge is mounted to the casing there is a step down in flow direction at the interface between each of the first casing port and the first valve port, and the second casing port and the second valve port.

The turbine bypass valve may further comprise a seal portion, the seal portion creating a seal between the casing and the valve cartridge, and between the first and second casing ports, the seal portion substantially preventing a flow path, in-between the casing and the valve cartridge, between the first casing port and the second casing port via the seal.

According to a second aspect of the disclosure there is provided a turbine bypass valve cartridge, for mounting to a casing defining first and second casing ports, the valve cartridge comprising first and second valve ports; and a valve member, the valve member being movable between a first position in which there is a flow path between the first and second valve ports, and a second position in which the valve member substantially blocks said flow path between the first and second valve ports; and wherein the valve cartridge is configured to be mounted to the casing such that the first valve port is aligned with the first casing port, and the second valve port is aligned with the second casing port.

The turbine bypass valve cartridge may be for mounting to a casing further defining a third casing port. The valve cartridge may further comprise a third valve port; and in the second position there may be a flow path between the first and third valve ports. The valve cartridge may be configured to be mounted to the casing such that the third valve port is aligned with the third casing port.

The valve cartridge may be configured to be received by a valve cavity defined by the casing.

The casing ports of the casing to which the valve cartridge is configured to be mounted may adjoin the valve cavity.

The valve member may be configured to be located in a valve chamber.

In the first position, said flow path between the first and second valve ports may be configured to be via the valve chamber. In the second position, the valve member may be configured to substantially block said flow path between the first and second valve ports via the valve chamber.

The valve cartridge may be a rotary valve cartridge, whereby said movement of the valve member between the first and second positions is a rotation.

The turbine bypass valve cartridge may be configured for mounting to a casing which forms part of a turbine housing or exhaust manifold of an engine of which the turbine bypass valve cartridge forms part.

The valve cartridge may comprise an anti-rotation feature configured to prevent relative rotation between the casing and the valve cartridge when the valve cartridge is mounted to the casing.

The casing may comprise a second anti-rotation feature configured to engage the anti-rotation feature when the valve cartridge is mounted to the casing.

The anti-rotation feature may comprise a protrusion which projects outwardly from the valve cartridge and which is configured to be received by a recess which forms part of the second anti-rotation feature.

The valve cartridge may comprise a main body which supports the valve member. The main body may have an outer surface which is configured to contact the casing when the valve cartridge is mounted to the casing. The outer surface may be formed of a deformable and/or abradable material which conforms to a shape of the casing when the valve cartridge is mounted to the casing.

Each of the first and second valve ports may be configured such that when the valve cartridge is mounted to the casing there is a step down in flow direction at the interface between each of the first casing port and the first valve port, and the second casing port and the second valve port.

The turbine bypass valve cartridge may further comprise a seal portion. The seal portion may be configured to create a seal between the casing and the valve cartridge when the valve cartridge is mounted to the casing, and between the first and second casing ports, the seal portion substantially preventing a flow path, in-between the casing and the valve cartridge, between the first casing port and the second casing port via the seal.

According to a third aspect of the disclosure there is provided a method of assembling a turbine bypass valve, the turbine bypass valve comprising a casing defining first and second casing ports; and a valve cartridge comprising: first and second valve ports; and a valve member, the valve member being movable between a first position in which there is a flow path between the first and second valve ports, and a second position in which the valve member substantially blocks said flow path between the first and second valve ports; and wherein the method comprises mounting the valve cartridge to the casing such that the first valve port is aligned with the first casing port, and the second valve port is aligned with the second casing port.

The casing may further define a third casing port; the valve cartridge may further comprise a third valve port. In the second position there may be a flow path between the first and third valve ports. The method may further comprise the valve cartridge being mounted to the casing such that the third valve port is aligned with the third casing port.

The casing may define a valve cavity which receives the valve cartridge.

The casing ports may adjoin the valve cavity.

The valve member may be located in a valve chamber.

In the first position, said flow path between the first and second valve ports may be via the valve chamber. In the second position, the valve member may substantially block said flow path between the first and second valve ports via the valve chamber.

The valve may be a rotary valve, whereby said movement of the valve member between the first and second positions is a rotation.

Said casing may form part of a turbine housing or exhaust manifold of an engine of which the turbine bypass valve forms part.

The valve cartridge may comprise an anti-rotation feature configured to prevent relative rotation between the casing and the valve cartridge when the valve cartridge is mounted to the casing.

The casing may comprise a second anti-rotation feature. The method may comprise engaging the anti-rotation feature with the second anti-rotation feature when the valve cartridge is mounted to the casing.

The anti-rotation feature may comprise a protrusion which projects outwardly from the valve cartridge. The second anti-rotation feature may comprise a recess which receives said protrusion.

The valve cartridge may comprise a main body which supports the valve member. The main body may have an outer surface formed of a deformable and/or abradable material. The method may further comprise the outer surface contacting the casing when the valve cartridge is mounted to the casing, the outer surface conforming to a shape of the casing when the valve cartridge is mounted to the casing.

When the valve cartridge is mounted to the casing there may be a step down in flow direction at the interface between each of the first casing port and the first valve port, and the second casing port and the second valve port.

The turbine bypass valve may further comprise a seal portion. The method may further comprise the seal portion creating a seal between the casing and the valve cartridge, and between the first and second casing ports. The seal portion may substantially prevent a flow path, in-between the casing and the valve cartridge, between the first casing port and the second casing port via the seal.

BRIEF DESCRIPTION OF THE DRAWINGS

The disclosure will now by described by way of example, with reference to the accompanying figures in which.

DETAILED DESCRIPTION OF EMBODIMENTS OF THE DISCLOSURE

Figure 1:
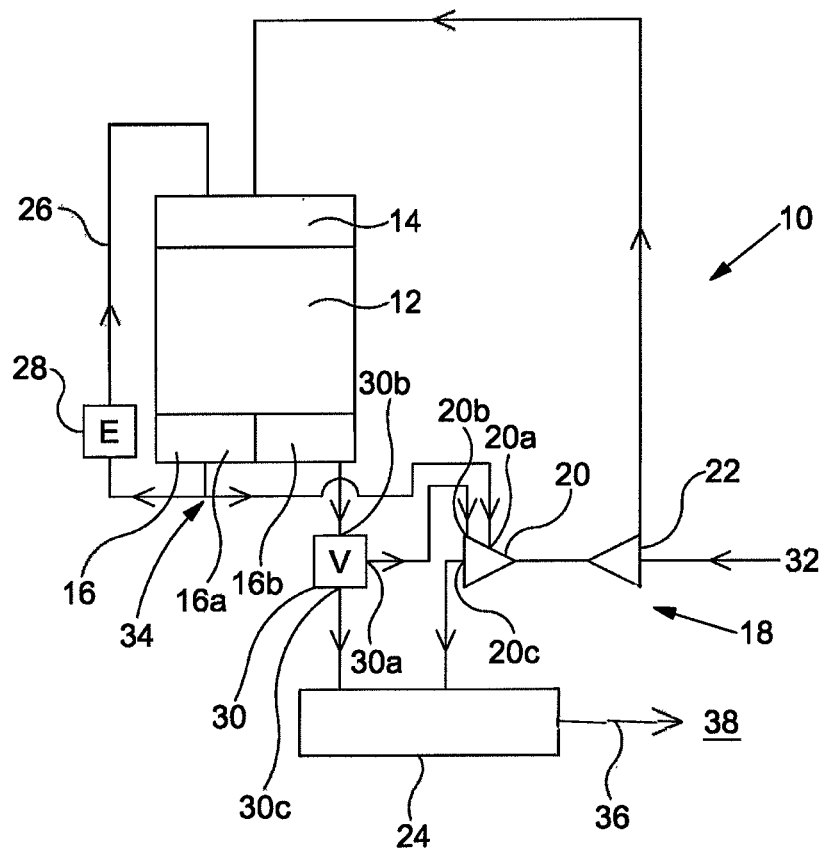
FIG. 1 shows a schematic view of a known engine arrangement of which a valve according to an embodiment of the present disclosure may form part.

FIG. 1 shows a schematic view of a known engine arrangement 10. The engine arrangement includes a plurality of combustion chambers 12 which are connected to an inlet manifold 14 and an outlet manifold 16. The outlet manifold 16 is separated into a first portion 16a and a second portion 16b. The first portion 16a of the outlet manifold is connected to a first set (not shown) of the combustion chambers 12, and the second portion 16b of the outlet manifold 16 is connected to a second set (again, not shown) of the combustion chambers 12.

The engine arrangement also comprises a turbocharger 18 having, as is well known, a turbine 20 and a compressor 22. The engine arrangement further includes an exhaust after treatment system 24, an EGR circuit 26, which includes an EGR valve 28, and, finally, a turbine bypass valve 30.

In use, the combustion chambers 12 are supplied with fuel and air, the air being provided from the atmosphere 38 via the engine air inlet 32, the air passing through the compressor 22 of the turbocharger 18 and inlet manifold 14. Once the fuel and air has been burnt in the combustion chambers 12, exhaust gas is produced which passes to the outlet manifold 16. The exhaust gas from the first portion 16a of the exhaust manifold 16 is supplied to a T-junction 34 at which it is split so that it flows both to an EGR (exhaust gas recirculation) circuit 26 and to a first inlet 20a of the turbine 20 of the turbocharger 18. The EGR circuit 26 passes back to the inlet manifold 14 and the amount of exhaust gas which passes into the EGR circuit 26 is controlled by the EGR valve 28. The manner in which the EGR circuit functions is entirely conventional and is not key to the present disclosure. Consequently, for the sake of brevity, further discussion as to the operation of the EGR circuit is omitted.

The turbine 20 of the turbocharger 18 is a twin inlet (or twin volute) turbine. As such, the turbine includes a second inlet 20b. This inlet 20b of the turbine 20 is supplied by a first outlet 30a of the bypass valve 30. The bypass valve 30 is in turn supplied with exhaust gas from the second portion 16b of the exhaust manifold 16 via an inlet 30b of the bypass valve 30.

The exhaust gas provided to the turbine 20 of the turbocharger 18 via the inlets 20a, 20b causes a turbine wheel (not shown) of the turbine 20 to rotate. The exhaust gas then exits the turbine 20 via the turbine outlet 20c and passes to an exhaust after-treatment system 24 (e.g. a particulate trap and/or selective catalytic reduction arrangement). The exhaust gas then exits the after-treatment system 24 via an engine outlet 36 to atmosphere 38. The rotation of the turbine wheel of the turbine caused by the exhaust gases provided to the turbine 20 causes rotation of a compressor wheel (again, not shown) of the compressor 18. Rotation of the compressor wheel results in air at atmospheric pressure drawn in to the compressor through the engine inlet 32 to be pressurised to an elevated (or boost) pressure by the compressor wheel. This pressurised gas is then supplied to the inlet manifold 14 as previously discussed.

The bypass valve 30 also includes a second outlet 30c which is connected to the after-treatment system 24 (without going through the turbine).

The bypass valve 30 can be controlled so that it is possible to selectively open the second outlet 30c. When the second outlet 30c is open, at least some of the exhaust gas from the second portion 16b of the outlet manifold 16 which would have otherwise passed to the inlet 20b of the turbine 20 can flow via the outlet 30c to the after-treatment system 24. Such gas is said to bypass the turbine 20. The ability for gas to bypass the turbine 20 may be advantageous in several situations. First, in a situation where the turbine 20 is over-speeding, the ability to bypass the turbine, and thereby reduce the amount of exhaust gas being supplied to the turbine will reduce the amount of exhaust gas rotating the turbine wheel and hence reduce the speed of the turbine wheel. Secondly, in some applications, the after-treatment system 24 may only function effectively when it is at a required operating temperature. This may be the case when, for example, the after-treatment system 24 includes a temperature-sensitive catalyst. The required operating temperature of the after-treatment system 24 may be considerably in excess of room temperature. Consequently, at some point during the operation of the engine arrangement 10 (for example, just after engine switch on) the after-treatment system 24 may be operating at a temperature below the required operating temperature. In this situation, the bypass valve 30 can be opened such that some of the hot exhaust gas which would otherwise pass to the turbine 20, passes to the after-treatment system 24 without passing through the turbine 20, thereby causing the temperature of the after-treatment system 24 to be raised relatively quickly so that it can reach its operating temperature.

Once it is no longer desired to allow some of the exhaust gas from the second portion 16b of the exhaust manifold 16 to bypass the turbine 20, the bypass valve 30 can be actuated so as to close it, thereby closing the second outlet 30c and ensuring that all of the exhaust gas passing into the bypass valve 30 from the second portion 16b of the exhaust manifold 16 passes to the turbine 20 of the turbocharger 18.

The engine arrangement 10 described above provides context as to the operation of a turbine bypass valve. It will be appreciated that a bypass valve according to the present disclosure may be utilised as part of any appropriate engine arrangement. The specific structural details of a bypass valve according to the present disclosure are now discussed in more detail below. In addition, although the disclosure is described in relation to a turbine which forms part of a turbocharger, the disclosure equally applies to any type of turbine, for example, but not limited to, a turbine that forms part of a power turbine.

A problem with known bypass valves is that they can be complicated and therefore expensive to manufacture. This is particularly the case where a bypass valve may be integrated with another component of the engine arrangement of which it forms part. For example, but not limited to, the bypass valve may be integrated with an inlet of the turbine or an exhaust manifold. In such situations, increased complexity of manufacture of the bypass valve is due, at least in part, to the fact that the machine tolerances for the component with which the bypass valve is integrated are usually relatively large. However, due to the sealing requirements of the valve, the manufacturing tolerances of the valve are relatively small. It follows that, although the manufacturing tolerances of the component with which the valve is integrated are relatively large, because the integrated valve has relatively small manufacturing tolerances, the whole component now has to be manufactured with the relatively small manufacturing tolerances to ensure that the tolerances for the valve are met. One way of solving this problem is to separate the valve from the component with which it is integrated. However, this has the disadvantage of increasing the package size of the engine arrangement may be disadvantageous in applications of the engine arrangement in which physical space to accommodate the engine arrangement is limited.

Figure 3:
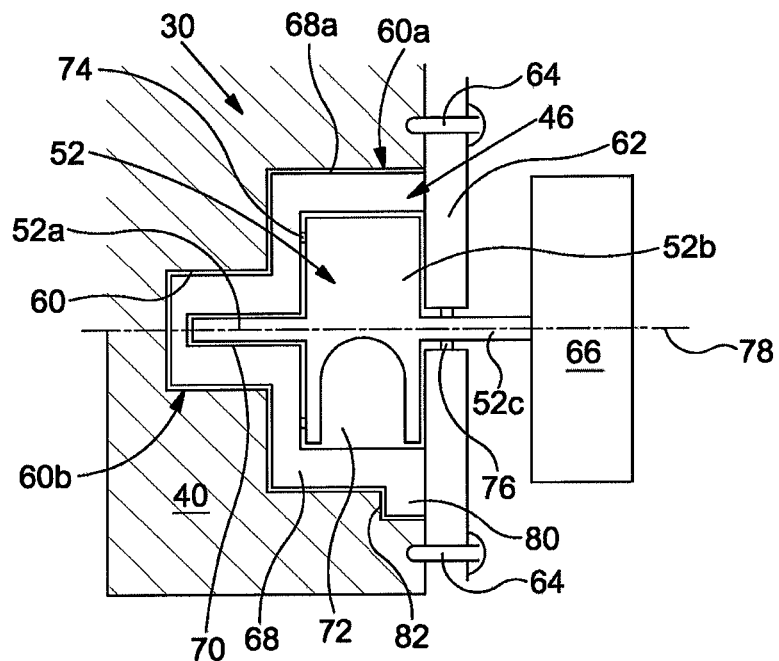
FIG. 3 shows a schematic cross section through an embodiment of a valve according to the present disclosure.
Figure 4:
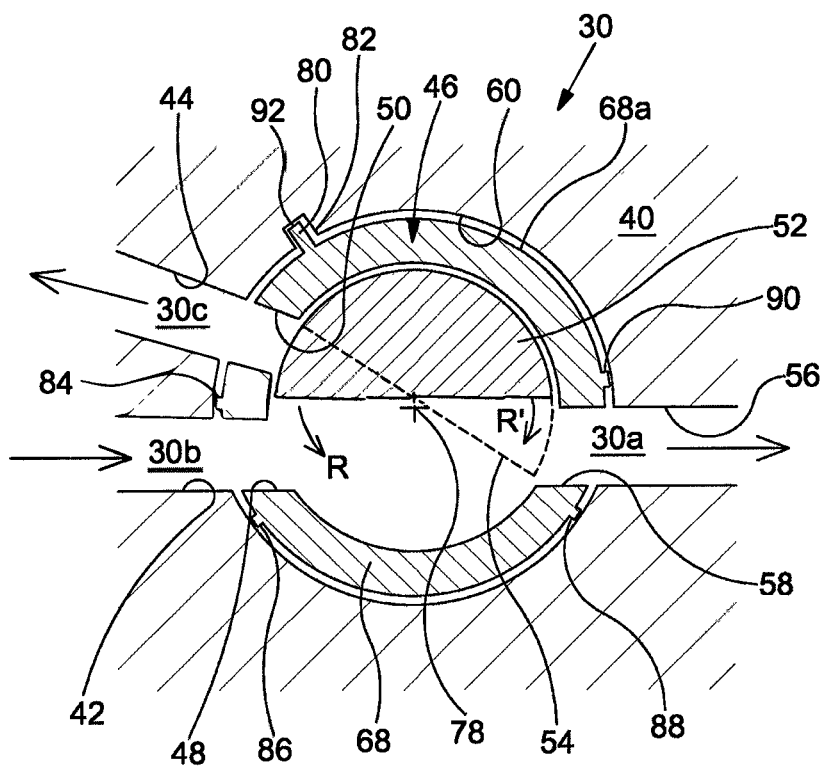
FIG. 4 shows a further cross section of the valve shown in FIGS. 3.

Referring to FIGS. 3 and 4, it can be seen that the bypass valve 30 comprises a casing 40 defining a first casing port 42 and a second casing port 44. A valve cartridge 46 is mounted to the casing 40. The valve cartridge 46 comprises a first valve port 48 and a second valve port 50. The valve cartridge 46 further comprises a valve member 52 which is movable between a first position (as indicated by dashed line 54) in which there is a flow path between the first and second valve ports 48, 50; and a second position (shown in solid line in FIG. 4) in which the valve member 52 substantially blocks said flow path between the first and second valve ports 48, 50. In this case, the way in which the valve member 52 in the second position substantially blocks said flow path between the first and second valve ports 48, 50 is by the valve member 52 obscuring (or blocking) the second valve port 50.

It can be seen that the valve cartridge 46 is mounted to the casing 40 such that the first valve port 48 is aligned with the first casing port 42, and the second valve port 50 is aligned with the second casing port 44. In this manner, exhaust gas entering the valve inlet 30b can pass through the first casing port 42 and then through the aligned first valve port 48. Likewise, exhaust gas exiting the outlet 30c of the valve can pass through the second valve port 50 and subsequently the aligned second casing port 44.

The bypass valve according to the present disclosure defines an alternative bypass valve. In addition, the bypass valve according to the present disclosure solves the above-mentioned problem relating to the complexity and cost of manufacturing a known bypass valve, particularly one which is integrated with a component of the engine of which the valve forms part. By having the casing of the valve and the valve cartridge as separate components, the casing can be manufactured to relatively large tolerances and the valve cartridge can be manufactured to relatively small tolerances to ensure that the valve seals correctly. The valve cartridge can then be mounted to the casing in the correct alignment so as to form the valve. If the casing 40 forms part of another component of an engine arrangement, this component can be manufactured to relatively large tolerances, whilst the valve cartridge is manufactured to relatively small tolerances. Because the casing 40 can be manufactured to relatively large tolerances this reduces the cost and complexity of manufacturing the casing and hence the valve as a whole. Furthermore, the ability to assemble the valve cartridge separately to the casing, and then mount the valve cartridge to the casing (as opposed to assembling all of the components of the valve simultaneously), means that the valve cartridge is more readily accessible, and, therefore, assembly of the valve is simplified and manufacturing costs and times are reduced.

The casing 40 further defines a third casing port 56. The valve cartridge 46 further comprises a third valve port 58. In the second position of the valve member 52 (as shown in solid line in FIG. 4) there is a flow path between the first valve port 48 and third valve port 58. The valve cartridge 46 is mounted to the casing 40 such that the third valve port 58 is aligned with the third casing port 56. In this way, the exhaust gas exiting the valve 30 via the first outlet 30a passes through the third valve port 58 and then through the aligned third casing port 56.

Figure 2:
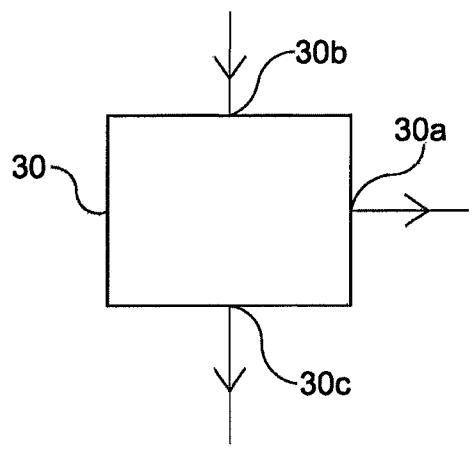
FIG. 2 shows an enlarged schematic view of a valve according to an embodiment of the present disclosure.

In light of the discussion of the operation of the bypass valve 30 given in relation to FIGS. 1 and 2, it will be appreciated that when the valve member is in the first position (as shown by dash lines 54 in FIG. 4) the bypass valve may be said to be open (or in an open configuration). Additionally, when the valve member 52 is in the second position the bypass valve 30 may be said to be closed (or in a closed configuration).

In operation as a turbine bypass valve is important that when the valve is in the open configuration the second outlet 30c is substantially blocked so that there is substantially no gas leakage out of the bypass valve via the second outlet 30c. The reason for this is that any gas passing through the second outlet port 30c will pass to the after-treatment system (and then to atmosphere) without passing through the turbine. This will necessarily lead to a reduction in turbine efficiency, which is understandably undesirable.

In some embodiments it may be desirable in the open configuration of the bypass valve for the valve member to substantially block the first outlet 30a. In this way, the valve ensures that substantially all of the exhaust gas passing into the valve exits through the second outlet 30c and hence to the after-treatment system. This can be beneficial in ensuring that the after-treatment system heats up as quickly as possible. Despite what has been said above for it be desirable for the valve member to substantially block the first outlet 30a when a valve is in the open configuration, it is not essential for all embodiments.

The casing 40 defines a valve cavity 16 which receives the valve cartridge 46. In the present embodiment, the valve cartridge 46 is generally cylindrical. The valve cavity 60 has a shape which corresponds to that of the valve cartridge 46. Consequently, the valve cavity 60 is also generally cylindrical. However, it will be appreciated that in other embodiments, the valve cartridge may have any appropriate shape and the valve cavity may also have any appropriate shape provided it can receive the valve cartridge. In the embodiment shown in FIGS. 3 and 4 the valve cavity 60 has an open end 60a and a closed end 60b. During manufacture the valve cartridge 46 is inserted into the valve cavity 60 of the casing 40 via the open end 60a of the cavity 60. An end plate 62 is then affixed to the casing 40 over the valve cartridge 46 so as to close the open end 60a of the cavity 60 and help to secure the valve cartridge in place within the casing. In the presently shown embodiment the end plate 62 is affixed to the casing using fixing bolts 64. However, it will be appreciated that, in other embodiments, any appropriate fixing or fixing method (e.g. adhesive, welding or staking) may be used.

FIG. 3 also shows an actuator 66 mounted to the valve member 52. The actuator 66 can be actuated so as to move the valve member between the first and second positions. Any appropriate actuator may be used and use of actuators to actuate valves is well known in the art. Due to the fact that the way in which the valve member is actuated is not a key aspect of the present disclosure, and given that such technology is well known, further discussion of this point is omitted for the sake of brevity. The actuator 66 may be mounted to the valve member 52 before or after the valve cartridge 46 is mounted to the casing 40.

The valve cavity 60 is such that the casing ports 42, 44 and 56 adjoin the valve cavity 60.

As can be seen most clearly in FIG. 3, the valve cartridge 46 comprises a main body 68 which supports the valve member 52. In particular, in the present embodiment, the main body 68 defines a blind bore 70 which receives a spindle portion 52a of the valve member 52. The valve member 52 is thereby supported by the main body 68 for relative rotation therewith. The main body 68 of the valve cartridge 46 defines a generally cylindrical valve chamber 72. The valve chamber 72 contains the functional portion 52b of the valve member 52. The exact shape of the valve member is not a key aspect of the present disclosure. Suffice to say, any appropriate configuration of valve member may be used provided it is capable of creating the required flow path between the first and second valve ports in the first position and blocking the flow path between the first and second valve ports in a second position.

The embodiment of turbine bypass valve 30 shown within FIG. 3 includes a pair of seals. In particular, the valve cartridge 46 comprises a first seal 74 which is sandwiched between the valve member 52 and main body 68 so as to substantially prevent any leakage between the valve ports 48, 50 and 58 between the valve member 52 and main body 68. Furthermore, the valve 30 includes a second seal 76 which is located between a second spindle portion 52c of the valve member 52 and the end plate 62. This seal substantially prevents any gas leakage from the valve chamber 72 to atmosphere via the opening in the end plate 62 through which the spindle 52c of the valve member 52 passes. Again, the exact sealing used within the valve is not a key aspect of the disclosure and so further discussion is omitted. Suffice to say, the person skilled in the art would be readily able to utilise any appropriate sealing configuration to ensure that there is no leakage between the various ports of the valve and no leakage from the valve to atmosphere.

It will be appreciated that the valve chamber 72 is such that, in the first position of the valve member, the flow path between the first and second valve port is via the valve chamber, and, in the second position of the valve member, the valve member substantially blocks said flow path between the first and second valve ports via the valve chamber 72.

The bypass valve 30 described in relation to the present embodiment is a rotary valve. That is to say, movement of the valve member 52 between the first and second positions is a rotation. In particular, as shown in FIG. 4, it is a rotation (R or R') about a rotation axis 78. Rotation (R, R') of the valve member is, as previously discussed, effected by the actuator 66. In other embodiments, the valve may be any appropriate type of valve, having an appropriate valve member, which is actuated in any appropriate manner so as to cause the valve member to move between the first and second positions. For example, the valve may be a ball valve, a butterfly valve, choke valve, a gate valve, a pocket valve or a spool valve.

As previously discussed, the casing 40 of the valve may form part of any portion of an engine arrangement of which the valve forms part. For example, the casing may be integral with the housing of the turbine or be integral with the exhaust manifold. Alternatively, the casing may form part of any other appropriate portion of an engine of which the valve forms part.

The valve cartridge 46 comprises an anti-rotation feature 80. The anti-rotation feature 80 is configured to prevent relative rotation between a casing 40 and the valve cartridge 46 when the valve cartridge 46 is mounted to the casing 40. Likewise, the casing 40 comprises a second anti-rotation feature 82 which is configured to co-operate with (in this example by engagement) the anti-rotation feature 80 of the valve cartridge 46 when the valve cartridge 46 is mounted to the casing 40 so as to limit or prevent said relative rotation between the casing and the valve cartridge. In some embodiments only a first or second anti-rotation feature may be required.

In the described embodiment the anti-rotation feature 80 comprises a protrusion which projects outwardly from the valve cartridge (and, in particular, from an outer surface of the valve cartridge 46). The second anti-rotation feature 82 comprises a recess configured to receive said protrusion.

It will be appreciated that, in other embodiments, any appropriate anti-rotation feature (or co-operating pair of anti-rotation feature and second anti-rotation feature) may be used so as to prevent relative rotation between the casing and the valve cartridge. For example, the anti-rotation feature of the valve cartridge and anti-rotation feature of the casing may both include a recess into which a retaining pin is inserted (for example, in a direction generally parallel to the axis of rotation of the valve member). Alternatively, a bore may pass through both a portion of the casing and a corresponding portion of the valve cartridge (for example, in a direction generally perpendicular to the axis of rotation of the valve member) and a pin or other fastener may be inserted into the bore. In addition, it will be appreciated that whilst in the presently described embodiment, the anti-rotation feature of the cartridge comprises a protrusion and the anti-rotation feature of the casing comprises a corresponding recess, in other embodiments this may be a vice-versa.

The valve may be such that the valve cartridge includes an alignment feature configured to ensure that when the valve cartridge is mounted to the casing it is in a correct orientation. In particular, as discussed above, the correct orientation is one in which the first valve port is aligned with the first casing port and the second valve port is aligned with the second casing port. Similarly, if the valve includes a third valve port and a third casing port, these should also be aligned. In this way, the alignment feature ensures that the valve cartridge cannot be mounted to the casing in an incorrect orientation. As such, the casing and valve cartridge can be said to be poka-yoke.

The casing 40 may include a second alignment feature which is configured to co-operate with or engage with the alignment feature of the valve cartridge so as to ensure that the relative alignment between the valve cartridge and casing when the valve cartridge is mounted to the casing is correct.

In the present embodiment the anti-rotation features and the alignment features are one and the same. As such, the alignment feature of the valve cartridge comprises the protrusion which projects outwardly from the valve cartridge and the second alignment feature of the casing includes the recess which is configured to receive the protrusion. Although in the present embodiment the anti-rotation features and alignment features are one and the same, this need not be the case—in some embodiments they may be separate entities. Furthermore, although a specific example of alignment features is described, it would be appreciated that any appropriate alignment features can be used provided such alignment features ensure that, when the valve cartridge is mounted to the casing, the valve cartridge and casing are correctly aligned. Although the presently described embodiment comprises both an anti-rotation feature and an alignment feature, in other embodiments this need not be the case. For example, a valve according to the present disclosure may include an anti-rotation feature but not include an alignment feature.

In the presently described embodiment the valve cartridge and valve cavity both have a cross-section which is circular and therefore relative rotation between the two is possible and the valve cartridge can be mounted to the casing at any relative rotational position. In other embodiments the shape of the valve cartridge and valve cavity themselves may constitute an anti-rotation and/or alignment feature. For example, the main body of the cartridge may have an outer cross-sectional shape which is hexagonal and the valve cavity may have a corresponding hexagonal cross-sectional shape. In this situation the hexagonal shape will prevent rotation. It will also ensure alignment (albeit, if the hexagonal shape is regular, with six different possibilities).

The main body 68 of the valve cartridge 46 has an outer surface 68*a* which contacts the casing 40 when the valve cartridge 46 is mounted to the casing 40. The outer surface may be formed of a deformable and/or abradable material.

The deformable and/or abradable material conforms to a shape of the casing 40 when the valve cartridge 46 is mounted to the casing 40. In particular, in relation to the presently described embodiment, when the valve cartridge 46 is mounted to the casing 40 by means of the valve cartridge 46 being pressed into the valve cavity 60 of the casing, the deformable and/or abradable material conforms to the shape of the valve cavity 60 as defined by the walls of the casing which define the valve cavity 60. Such conforming of the outer surface of the main body of the valve cartridge has several benefits. First, by virtue of the outer surface of the main body of the valve cartridge conforming to the shape of the casing, there is substantially no space between the valve cartridge and the casing when the valve cartridge is mounted to the casing. This means that any potential leak path between the casing and the outer surface of the main body of the valve cartridge is substantially prevented. Secondly, because the outer surface of the main body of the valve cartridge conforms to the shape of the casing, there may exist very high friction between the valve cartridge and the casing should relative movement between the valve cartridge and casing be attempted. Consequently, this helps to ensure that the valve cartridge is securely located within the casing. This helps to prevent the valve cartridge from becoming misaligned with the casing and helps to ensure that the valve cartridge and casing are not unintentionally separated.

Any suitable deformable and/or abradable material may be used provided it deformable and/or abradable by the movement concerned and provided it is suitable for operating in the environment (e.g. temperature) in which it is located. Examples of suitable abradable material include, depending on temperature in service, nickel graphite or graphite, any of the proprietary Ytterbia Zirconate based ceramic abradable powders, Aluminum Bronze/Polyester abradable powders (e.g. Metco 601), Nickel—5% Aluminum thermal spray powders (e.g. Metco 450), CoNiCrAlY-BN/Polyester abradable thermal spray powders and Nickel Chromium Alloy/Boron Nitride thermal spray powders. At least some of these materials are supplied by Oerlikon Metco (see https://www.oerilkon.com/metco/en/products-services/coating-materials/coating-materials-thermal-spray/abradables-polymer-fillers/). Further examples of suitable material may be found with reference to the coatings described in U.S. Pat. No. 5,185,217 and U.S. Pat. No. 5,975,845, the relevant portions of both of which are incorporated by reference.

In some embodiments the whole main body 68 of the valve cartridge 46 may be formed of the deformable and/or abradable material, such as graphite, which would abrade and also allow the sealing features on the outer surface 68*a* to be integral but made thin and deformable. Alternatively, the main body could be formed from a first (relatively non-deformable/abradable) material, such as cast iron, and then coated with a deformable and/or abradable material coating, such as graphite/nickel graphite or some other abradable coating as discussed above.

Although the previously discussed examples concern the valve cartridge including a deformable and/or abradable coating, in other embodiments, in addition or as an alternative, the casing 40 may include a deformable and/or abradable coating which prevents said potential leak path between the casing and the outer surface of the main body of the valve cartridge.

In some embodiments the entire outer surface of the valve cartridge is formed of or coated in abradable and/or deformable material. Alternatively, a coating of deformable and/or abradable material may be applied only to specific areas of the valve cartridge. For example, such a coating may be applied to one or more seal portion (e.g. 84, 86, 88, 90 and/or 92) of the valve cartridge (said one or more seal portion being located on the outer surface of the valve cartridge). In such embodiments, the coating of deformable and/or abradable material may be sufficient to create a seal (to substantially prevent a potential leak path between the casing and the outer surface of the main body of the valve cartridge), but not sufficient to prevent the necessary push/interference fit as the valve cartridge is inserted into the casing.

Within the present embodiment, each of the first and second casing ports 42, 44 and corresponding first and second valve ports 48, 50 are configured such that when the valve cartridge is mounted to the casing there is a step down in flow direction at the interface between each of i) the first casing port and the first valve port, and ii) the second casing port and the second valve port. In the present embodiment this also applies to the third casing port 56 and third valve port 58. In more detail, with reference to FIG. 5, reference to there being a step down in the flow direction at the interface between the casing port and the valve port means as follows.

Figure 5:
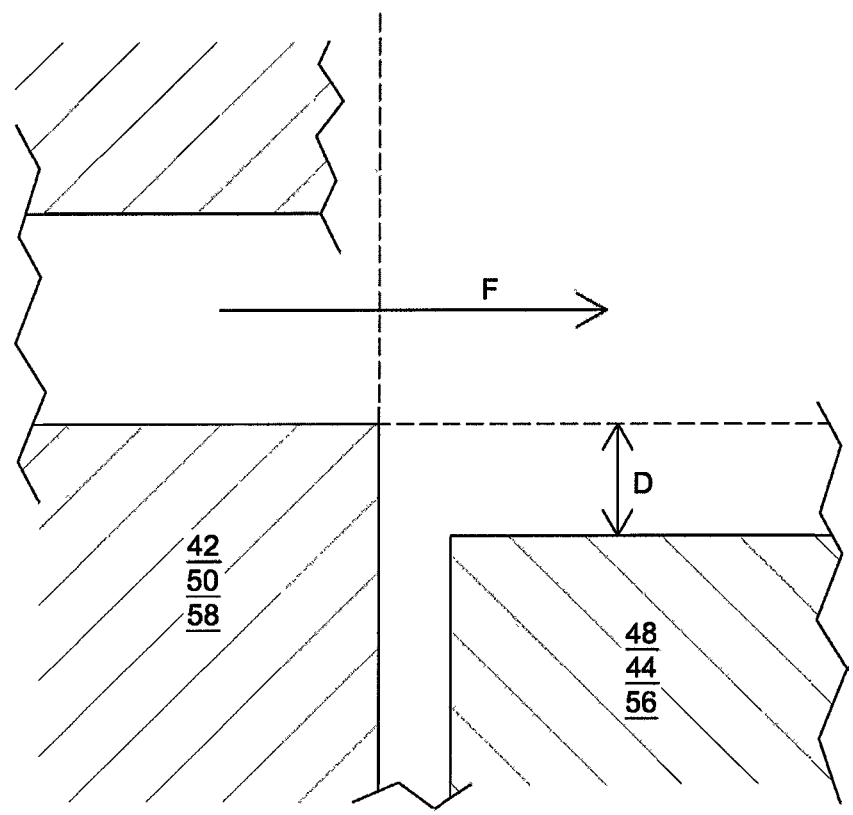
FIG. 5 shows a schematic view of step down in flow direction at the interface between a casing port and a valve port.

The first key aspect of determining whether there is a step down in the flow direction at a particular interface between a casing port and a valve port is to determine the flow direction of gas passing through the relevant port. Within FIG. 5 the flow direction of the gas is indicated by F. It can be seen from the figure that the flow direction F is specific to each of the casing/valve ports. In particular, the direction of flow is from the first casing port to the first valve port 48, from the second valve port 50 to the second casing port 44; and from the third valve port 58 to the third casing port 56. In each of the cases what is meant by a step down in the flow direction at the interface between the casing and valve port is that gas flowing from a first upstream port (42, 50, 58) to a second downstream port (48, 44, 56) experiences an effective increase in the size (e.g. diameter) of the conduit through which the gas is flowing as it passes from the upstream port to the downstream port. In FIG. 5 the increase in size (e.g. diameter) of the conduit as the gas flows from a first port to a second port is represented by arrow D. The benefit of a step down in the flow direction at a particular interface between a casing port and a valve port is that turbulent flow which is caused by the gas passing over an edge (e.g. change in conduit diameter) at the interface is directed towards the edge of the conduit. By directing turbulent flow towards the edge of the conduit (as opposed to the centre of the conduit), this minimises the chance that turbulent flow will pass to the turbine, thus minimising the chance that the turbine operates with reduced efficiency.

The valve 30 comprises a seal portion, the seal portion creating a seal between the casing 40 and the valve cartridge 46, and between the first 42 and second 44 casing ports. The seal portion substantially prevents a flow path, in-between the casing 40 and the valve cartridge 46, between the first casing port 42 and the second casing port 44 via the seal. The seal portion helps to prevent gas leakage between the first casing port 42 and the second casing port 44 via the space between the casing 40 and the valve cartridge 46. This helps to prevent gas from leaking around the valve member, thus preventing the effectiveness of the valve from being compromised.

In the present embodiment, as shown in FIG. 4, the seal portion comprises a seal projection 84 which projects outwards from valve cartridge (and, in particular, the outer surface of the main body of the valve cartridge). The projection 84 contacts the wall of the casing 40 which defines the valve cavity 60 and thereby forms a seal. In the present embodiment the projection 84 extends along the entire length of cartridge 46 in a direction parallel to the rotation axis 78. The embodiment shown includes several more similar seal portions: two 86, 88 between the first and third casing ports 42, 56; and two 90, 92 between the second and third casing ports 44, 56.

It will be appreciated that in other embodiments the seal portion(s) may take any appropriate form, provided that they are capable of carrying out their sealing function. In addition, the sealing portions of the described embodiment include a projection of the valve cartridge which engages with a wall of the casing. In other embodiments the sealing portion may include a projection of the casing which engages with a wall of the valve cartridge.

It is also worth noting that, in some embodiments the anti-rotation and/or alignment feature(s) may be combined with a seal portion. For example, in the case of seal portion 92, the projection 80 in combination with recess 82 not only forms anti-rotation and alignment features, but also a seal portion.

It will be appreciated that many modifications to the described embodiment are possible which still fall within the scope of the disclosure as defined by the claims.

The invention claimed is:

1. A turbine bypass valve comprising:
a casing defining first and second casing ports; and
a valve cartridge mounted to the casing; wherein the valve cartridge comprises:
first and second valve ports; and
a valve member, the valve member being movable between a first position in which there is a flow path between the first and second valve ports, and a second position in which the valve member substantially blocks said flow path between the first and second valve ports;
wherein the valve cartridge is mounted to the casing such that the first valve port is aligned with the first casing port, and the second valve port is aligned with the second casing port;
wherein the valve cartridge comprises an anti-rotation feature configured to prevent relative rotation between the casing and the valve cartridge when the valve cartridge is mounted to the casing;
wherein the casing comprises a second anti-rotation feature configured to engage the anti-rotation feature when the valve cartridge is mounted to the casing; and
wherein the anti-rotation feature comprises a protrusion which projects outwardly from the valve cartridge and the second anti-rotation feature comprises a recess configured to receive said protrusion; or
wherein the second anti-rotation feature comprises a protrusion and the anti-rotation feature comprises a recess configured to receive said protrusion.

2. A turbine bypass valve according to claim 1, wherein:
the casing further defines a third casing port;
the valve cartridge further comprises a third valve port;
in the second position there is a flow path between the first and third valve ports; and
the valve cartridge is mounted to the casing such that the third valve port is aligned with the third casing port.

3. A turbine bypass valve according to claim 1, wherein the casing defines a valve cavity which receives the valve cartridge.

4. A turbine bypass valve according to claim 3, wherein the casing ports adjoin the valve cavity.

5. A turbine bypass valve according to claim 1, wherein the valve member is located in a valve chamber.

6. A turbine bypass valve according to claim 5, wherein, in the first position, said flow path between the first and second valve ports is via the valve chamber, and, in the second position, the valve member substantially blocks said flow path between the first and second valve ports via the valve chamber.

7. A turbine bypass valve according to claim 1, wherein the valve is a rotary valve, whereby said movement of the valve member between the first and second positions is a rotation.

8. A turbine bypass valve according to claim 1, wherein said casing forms part of a turbine housing or exhaust manifold of an engine of which the turbine bypass valve forms part.

9. A turbine bypass valve according to claim 1, wherein the valve cartridge comprises a main body which supports the valve member, the main body having an outer surface which contacts the casing when the valve cartridge is mounted to the casing, wherein the outer surface is formed of a deformable and/or abradable material which conforms to a shape of the casing when the valve cartridge is mounted to the casing.

10. A turbine bypass valve according to claim 1, wherein each of the first and second casing ports and the corresponding first and second valve ports are configured such that when the valve cartridge is mounted to the casing there is a step down in flow direction at the interface between each of the first casing port and the first valve port, and the second casing port and the second valve port.

11. A turbine bypass valve according to claim 1, further comprising a seal portion, the seal portion creating a seal between the casing and the valve cartridge, and between the first and second casing ports, the seal portion substantially preventing a flow path, in-between the casing and the valve cartridge, between the first casing port and the second casing port via the seal.

12. A turbine bypass valve cartridge, for mounting to a casing defining first and second casing ports and comprising a second anti-rotation feature, the valve cartridge comprising:
first and second valve ports; and
a valve member, the valve member being movable between a first position in which there is a flow path between the first and second valve ports, and a second position in which the valve member substantially blocks said flow path between the first and second valve ports;
wherein the valve cartridge is configured to be mounted to the casing such that the first valve port is aligned with the first casing port, and the second valve port is aligned with the second casing port;
wherein the valve cartridge further comprises an anti-rotation feature configured to prevent relative rotation between the casing and the valve cartridge when the valve cartridge is mounted to the casing;
wherein the anti-rotation feature is configured to engage the second anti-rotation feature when the valve cartridge is mounted to the casing; and
(A) wherein the anti-rotation feature comprises a protrusion which projects outwardly from the valve cartridge and the second anti-rotation feature comprises a recess configured to receive said protrusion; or
(B) wherein the second anti-rotation feature comprises a protrusion and the anti-rotation feature comprises a recess configured to receive said protrusion.

13. A turbine bypass valve cartridge according to claim 12, for mounting to a casing further defining a third casing port, wherein the valve cartridge further comprises a third valve port; and in the second position there is a flow path between the first and third valve ports; and wherein the valve cartridge is configured to be mounted to the casing such that the third valve port is aligned with the third casing port.

14. A turbine bypass valve cartridge according to claim 12, wherein the valve cartridge is configured to be received by a valve cavity defined by the casing.

15. A turbine bypass valve cartridge according to claim 14, wherein the casing ports of the casing to which the valve cartridge is configured to be mounted adjoin the valve cavity.

16. A turbine bypass valve cartridge according to claim 12, wherein the valve member is configured to be located in a valve chamber.

17. A turbine bypass valve cartridge according to claim 16, wherein, in the first position, said flow path between the first and second valve ports is configured to be via the valve chamber, and, in the second position, the valve member is configured to substantially block said flow path between the first and second valve ports via the valve chamber.

18. A turbine bypass valve cartridge according to claim 12, wherein the valve cartridge is a rotary valve cartridge, whereby said movement of the valve member between the first and second positions is a rotation.

19. A turbine bypass valve cartridge according to claim 12, the turbine bypass valve cartridge being configured for mounting to a casing which forms part of a turbine housing or exhaust manifold of an engine of which the turbine bypass valve cartridge forms part.

20. A turbine bypass valve cartridge according to claim 12, wherein the valve cartridge comprises a main body which supports the valve member, the main body having an outer surface which is configured to contact the casing when the valve cartridge is mounted to the casing, wherein the outer surface is formed of a deformable and/or abradable material which conforms to a shape of the casing when the valve cartridge is mounted to the casing.

21. A turbine bypass valve cartridge according to claim 12, wherein each of the first and second valve ports are configured such that when the valve cartridge is mounted to the casing there is a step down in flow direction at the interface between each of the first casing port and the first valve port, and the second casing port and the second valve port.

22. A turbine bypass valve cartridge according to any of claim 12, further comprising a seal portion, the seal portion being configured to create a seal between the casing and the valve cartidge when the valve cartridge is mounted to the casing, and between the first and second casing ports, the seal portion substantially preventing a flow path, in-between the casing and the valve cartridge, between the first casing port and the second casing port via the seal.

23. A method of assembling a turbine bypass valve, the turbine bypass valve comprising:
a casing defining first and second casing ports; and
a valve cartridge comprising:
a first and second valve ports; and
a valve member, the valve member being movable between a first, position in which there is a flow path between the first and second valve ports, and a second position in which the valve member substantially blocks said flow path between the first and second valve ports;
wherein the method comprises mounting the valve cartridge to the casing such that the first valve port is aligned with the first casing port, and the second valve port is aligned with the second casing port;
wherein the valve cartridge comprises an anti-rotation feature configured to prevent relative rotation between the casing and the valve cartridge when the valve cartridge is mounted to the casing;
wherein the anti-rotation feature engages the second anti-rotation feature when the valve cartridge is mounted to the casing; and
(A) wherein the anti-rotation feature comprises a protrusion which projects outwardly from the valve cartridge and the second anti-rotation feature comprises a recess which receives said protrusion when the valve cartridge is mounted to the casing; or
(B) wherein the second anti-rotation feature comprises a protrusion and the anti-rotation feature comprises a recess which receives said protrusion when the valve cartridge is mounted to the casing.

24. A method of assembling a turbine bypass valve according to claim 23, wherein the casing further defines a third casing port; the valve cartridge further comprises a third valve port; and in the second position there is a flow path between the first and third valve ports;
wherein the method further comprises the valve cartridge being mounted to the casing such that the third valve port is aligned with the third casing port.

25. A method of assembling a turbine bypass valve according to claim 23 wherein the casing defines a valve cavity which receives the valve cartridge.

26. A method of assembling a turbine bypass valve according to claim 25, wherein the casing ports adjoin the valve cavity.

27. A method of assembling a turbine bypass valve according to claim 23, wherein the valve member is located in a valve chamber.

28. A method of assembling a turbine bypass valve according to claim 27, wherein, in the first position, said flow path between the first and second valve ports is via the valve chamber, and, in the second position, the valve member substantially blocks said flow path between the first and second valve ports via the valve chamber.

29. A method of assembling a turbine bypass valve according to claim 23, wherein the valve is a rotary valve, whereby said movement of the valve member between the first and second positions is a rotation.

30. A method of assembling a turbine bypass valve according to claim 23, wherein said casing forms part of a turbine housing or exhaust manifold of an engine of which the turbine bypass valve forms part.

31. A method of assembling a turbine bypass valve according to claim 23, wherein the valve cartridge comprises a main body which supports the valve member, the main body having an outer surface formed of a deformable and/or abradable material; wherein the method further comprises the outer surface contacting the casing when the valve cartridge is mounted to the casing, the outer surface conforming to a shape of the casing when the valve cartridge is mounted to the casing.

32. A method of assembling a turbine bypass valve according to claim 23, wherein when the valve cartridge is mounted to the casing there is a step down in flow direction at the interface between each of the first casing port and the first valve port, and the second casing port and the second valve port.

33. A method of assembling a turbine bypass valve according to claim 23, further comprising a seal portion; the method further comprising the seal portion creating a seal between the casing and the valve cartridge, and between the first and second casing ports; wherein the seal portion substantially prevents a flow path, in-between the casing and the valve cartridge, between the first casing port and the second casing port via the seal.

* * * * *